United States Patent [19]

Rupp et al.

[11] Patent Number: 6,056,695
[45] Date of Patent: May 2, 2000

[54] DEVICE FOR TIME-RESOLVED AND SPACE-RESOLVED LOCATION OF A MINIATURISED EMITTER

[75] Inventors: Joerg Rupp, Schwalbach; Dieter Heidmann, Spiesen-Elversberg; Rainer Schmitt, Mandelbachtal; Bertram Bresser, Dillingen, all of Germany

[73] Assignee: Fraunhofer Gesellscaft zur Forderung der Angewandten Forschung e.V., Munich, Germany

[21] Appl. No.: 09/125,223
[22] PCT Filed: Mar. 12, 1997
[86] PCT No.: PCT/DE97/00480
§ 371 Date: Dec. 17, 1998
§ 102(e) Date: Dec. 17, 1998
[87] PCT Pub. No.: WO97/34163
PCT Pub. Date: Sep. 18, 1997

[30] Foreign Application Priority Data

Dec. 3, 1996 [DE] Germany ............... 196 09 564

[51] Int. Cl.[7] ............... A61B 8/14; A61F 2/02
[52] U.S. Cl. ............... 600/459; 128/903; 600/407; 367/127
[58] Field of Search ............... 600/407, 409, 600/461; 128/916, 897, 903; 310/314–317; 606/130; 367/98, 127

[56] References Cited

U.S. PATENT DOCUMENTS

| 5,042,486 | 8/1991 | Pfeiler et al. ............... 600/407 |
| 5,043,950 | 8/1991 | Schorum et al. ............... 367/98 |
| 5,054,005 | 10/1991 | Schorum ............... 367/127 |
| 5,807,258 | 9/1998 | Cimochowski et al. ............... 600/454 |
| 5,920,395 | 7/1999 | Schulz ............... 600/407 |
| 5,928,149 | 7/1999 | Habraken ............... 600/407 |
| 5,944,659 | 8/1999 | Flach et al. ............... 128/903 |

Primary Examiner—Marvin M. Lateef
Assistant Examiner—Ali M. Imam
Attorney, Agent, or Firm—Staas & Halsey LLP

[57] ABSTRACT

What is disclosed here is a transmitting and receiving means for ultrasonic waves, comprising a miniaturized ultrasonic generator which operates independently on a battery and which is appropriate for accommodation in a small encapsulating case for medical examinations, as well as at least one ultrasonic receiver which is connected to an analyzer which determines, with resolution in terms of time, the distance between the ultrasonic generator and the ultrasonic receiver.

The invention is characterised by the provisions that the transmitting means comprises an oscillator for generating a fundamental mode, a generator for generating a pulse string which may be used to activate the ultrasonic generator, a code generator which modulates the phase of the pulse string, a phase shifter which modulates the code onto the fundamental mode, as well as a driver stage which is connected to the ultrasonic generator, and that the receiving means includes one correlation receiver per ultrasonic receiver, which compresses the pulse strings emitted by the transmitting means into distinct correlation peaks.

16 Claims, 3 Drawing Sheets

CONVENTIONAL DELAY MEASUREMENT

DEVICE FOR TIME-RESOLVED AND SPACE-RESOLVED LOCATION OF A MINIATURISED EMITTER

FIELD OF THE INVENTION

The invention relates to a device for locating a miniaturised ultrasonic generator with resolution in terms of time and position. The device provides for a transmitting and receiving means for ultrasonic waves with a miniaturised ultrasonic generator which operates independently on a battery and which is appropriate for accommodation in a small encapsulating case preferably for medical examinations. Moreover at least one ultrasonic receiver is provided which is connected to an analyser which determines, with resolution in terms of time, the distance between the ultrasonic generator and the receiver.

PRIOR ART

Such devices play a special rôle in medical diagnostics, particularly in those cases where the medical diagnosis depends on the measurement of delays, as is required in the examination of the bowel function.

In the master thesis by J. Rupp, which deals with the topic of three-dimensional detection, with resolution in terms of time and position, of a miniaturised ultrasonic generator moving through the gastro-intestinal tract—engineering bases of an intestinal monitoring system, published by the electrical engineering division at the Saarland University in Saarbruecken/St. Ingbert, 1993, discloses a system of the claimed general type which constitutes the basis of the inventive idea described in the following.

The basic idea of the system described in that master thesis consists in the fact that a miniaturised ultrasonic generator for independent operation, together with all the switching units required for transmitting operation, is integrated into a pilular capsule designed for oral administration. With the oral administration of a pilula so designed the independently operating ultrasonic generator is conveyed by the natural peristalsis into the intestinal tract and is then excreted in the natural way after a certain time. When appropriate ultrasonic receivers are used which are disposed about the body to be examined and which are connected to suitable analyser units it is possible to conclude the respective distances by which the ultrasonic generator is spaced from the respective ultrasonic receivers by way of measurement of the delays of the ultrasonic waves emitted by the ultrasonic generator, which waves propagate up to the position of the respective ultrasonic receiver. The subsequent analysis of the measured signals applied simultaneously at various ultrasonic receivers allows for a precise determination of the three-dimensional position of the ultrasonic generator in space.

The proposed device may be used for an examination technique which permits the investigation of the bowel function, for instance, without interference with the organic environment and without putting too much strain on the patient.

One essential aspect of such a device is the most compact structure possible of the transmitting means which should incessantly emit ultrasonic signals throughout the entire period of examination. The electronic transmitting means used to generate the signals benefits from generally common pulsating circuits including inductive and capacitive elements for generating a pulsed voltage. Conceivable pulsating circuits such as a blocking-oscillator circuit or pulsator circuits with MOSFET elements are described on pages 26 to 32 of the aforementioned diploma thesis.

The fundamental idea supporting the application of pulsator circuits is the generation of the highest voltage peaks possible which are applied to the ultrasonic generator for generation of ultrasonic waves. As the measuring precision in the measurement of delays is dependent on the signal-to-noise ratio of the ultrasonic signal received the pulse energy should therefore be as high as possible. This is implemented in the described manner in such a way that the rated 3 Volt potential, which is supplied by the battery, is transformed by means of inductive coupling to maximum voltage peaks of roughly 50 Volt. It is hence possible to introduce a high amount of pulse energy into brief pulse strings in order to obtain a signal representing the signal-to-noise ratio, which is required for the accuracy in measurement.

Due to the use of analog devices for the structure of such pulsator circuits, e.g. coils and capacitors, the overall dimension of the circuits cannot be optionally reduced on account of the sizes of the individual elements.

BRIEF DESCRIPTION OF THE INVENTION

The invention is therefore based on the problem of improving a transmitting and receiving means for ultrasonic waves with a miniaturised ultrasonic generator which operates independently on a battery and which is appropriate for accommodation in a small encapsulating case for medical examinations, as well as with at least one ultrasonic receiver which is connected to an analyser which determines, with resolution in terms of time, the distance between the ultrasonic generator and the receiver, this improvement being made specifically in a way that the transmitting means may be further reduced without suffering from a loss in terms of measuring precision. Provisions of a further reduction of the transmitting means are intended to substantially reduce the interference with the environment of the transmitting means so that examinations on internal organs, for instance, will be possible.

The solution to the problem underlying the invention is defined in Patent claim 1. Improvements of the invention are the subject matters of claims 2 to 16.

The invention is supported by the idea that the transmitting means should be so set up that the use of conventional electronic devices may be dispensed with, which have a size which determines the overall size of the transmitting means essentially. By means of a transmitting means purely composed of digital devices it is possible to accommodate all the components necessary for the operation of the ultrasonic generator on a single chip, with the exception of the battery. This may be implemented in a way that the common approach with generation of high pulse voltages for the operation of the ultrasonic generator is set aside and rather a pulse compression technique is employed.

In accordance with the invention a transmitting and receiving means for ultrasonic waves with a miniaturised ultrasonic generator which operates independently on a battery and which is appropriate for accommodation in a small encapsulating case for medical examinations, as well as at least one ultrasonic receiver which is connected to an analyser which determines, with resolution in terms of time, the distance between the ultrasonic generator and the receiver, is characterised by the fact that the transmitting means comprises an oscillator for generating a fundamental mode, a generator for generating a pulse string which may be used for activating the ultrasonic generator, a code generator which modulates the phase of the pulse string, a phase shifter which modulates the code onto the fundamental mode, as well as a driver stage connected to the ultrasonic generator. Moreover, the receiving means comprises one correlating receiver per ultrasonic receiver, which compresses the pulse strings emitted by the transmitting means into distinct correlation peaks.

The inventive transmitting and receiving means, which can be completely implemented with means common in digital technology, operates at comparatively low transmitting voltages corresponding to the battery voltage. In order to achieve, however, pulse energies as high as those common with the known methods, long pulses are generated which activate the ultrasonic generator.

In reception, by contrast, provisions are made for re-compression, by means of an appropriate signal-processing system, of the signals emitted over a major period of time by means of a pulse compression circuit. With such a technique it is possible to obtain the signal-to-noise ratio signal which is necessary for a high measuring accuracy.

The transmitting means excites an ultrasonic generator with a phase-modulated signal. For instance, the ultrasonic generator may be excited with a string of phase-modulated square oscillations, with the auto-correlation function derived from the transmission signal of the ultrasonic generator presenting a distinct maximum.

An oscillator is provided for generating such a transmission signal, which generates a fundamental mode with a fundamental frequency which operates independently on a battery and which is appropriate for accommodation in a small encapsulating case preferably for medical examinations. Moreover at least one ultrasonic receiver is provided which is connected to an analyser which determines, with resolution in terms of time, the distance between the ultrasonic transmitter and receiver which serves as input for other circuit elements provided in the circuit controlling the ultrasonic generator. Hence the fundamental frequency $f_0$ is applied at a generator for the generation of a pulse string which may be used to activate the ultrasonic generator. A code generator, to which the fundamental frequency $f_0$ is applied as well, is connected to this generator which will be identified as PRR (pulse repetition rate) generator.

The PRR generator determines the pulse repetition rate at which, for instance, N oscillations of frequency $f_0$, which are combined in a fundamental cycle, is made available to the other electronic transmission means. The respective phase relationship of successive cycles is determined by the code generator. The determination of the phase relationship depends on the exciting function which is stored in the code generator and which is composed, for instance, of M-sequences, pseudo-noise strings or Barker codes.

If, for instance, a Barker code generator is used the phase relationship is shifted through 180° or not shifted, depending on the sign of the value stored in the code. To this end a phase shifter is used which is connected to the code generator and which has an input to which the fundamental frequency $f_0$ of the oscillator is equally applied. A downstream driver stage serves for appropriate signal amplification and transmits the pulse strings modulated in the afore-described manner to the ultrasonic generator.

The components of the transmitting means may be integrated completely into an ASIC chip without case, which may be accommodated in a small pilular case together with a battery as power supply. With inductive elements and capacitors known per se being avoided, a substantial miniaturisation of the circuit can be achieved. Even though the transmitting voltage which can be obtained with this electronic transmitter system corresponds only to the battery voltage supplied by the power pack it is yet possible to optimise the energy supplied into the system over the length of the pulse strings.

For an increase of the signal-to-noise ratio with signal levels so small a correlation receiver is used at the receiving end in accordance with the invention, which compresses the received pulse string into distinct correlation peaks. In this way, the signal-to-noise ratio is substantially improved whilst the necessary resolution in terms of time is achieved in delay measurement.

The receiving means is provided with an appropriate ultrasonic transducer with a joining signal amplifier for the detection of the ultrasonic waves. The amplified received signal is then split into two sub-signals which are separately supplied to a mixing stage which mixes the received signal separately with the fundamental mode $f_0$ as reference signal and with the $f_0$ shifted in phase through 90°. In this way, the quadrature components of the received signal are obtained. Respectively provided low-pass filters are used to cut off the higher frequency components carried in the signal at the double carrier frequency 2 $f_0$. The low-pass filtered signals are subsequently digitised by means of an A/D converter. Either of the two digitised quadrature components is then supplied to a correlator where it is correlated with the transmission pulse string stored as reference signal. The amounts of the two output signals of the correlators are then added to each other. The summation signal is then written into a memory unit which is configured as cyclic shift register so that access may be made to the last N actual values.

A threshold detector is connected at the output side of the correlator, to which the output signals of the correlator are applied. When the output signal of the correlator exceeds a defined threshold the threshold detector generates an interrupt signal which causes a downstream digital signal processor to read the values of the auto-correlation function, which are stored in the memory unit, and to determine the point of time of the maximum of the auto-correlation function. The position of the correlation maximum is characteristic of the time at which the ultrasonic signal arrives at the ultrasonic receiver.

The processor then determines centrally the delay difference between the ultrasonic generator and the ultrasonic receivers positioned in space by derivation from the pulse arrival times so determined at different receiving means, and the three-dimensional position of the generator is determined on the basis of the delay difference by means of a triangulation technique.

BRIEF DESCRIPTION OF THE DRAWING

The invention will be described in the following by an exemplary embodiment, with reference to the drawing in which.

DESCRIPTION OF EMBODIMENTS

The inventive device makes use of a pulse compression technique which implements the processing of signals in a way that long signal strings of a low amplitude are transformed into short high-amplitude pulses. Pulse compression techniques may be employed in ultrasonic delay measurement for improvement of the signal-to-noise ratio so that delay measurement will become possible in strongly attenuating media, too, e.g. through body tissue. The achieved gain is substantially based on the compression of the energy carried in the signal to the shortest point of time possible. Brief interfering pulses are drawn apart by the pulse compression units so as to form long low-amplitude noise.

Figure 1:
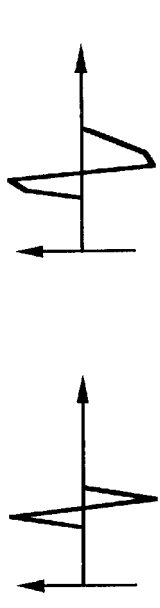
FIG. 1 is a schematic comparison of a system with conventional delay measurement against the inventive system operating on pulse compression.
Figure 1:
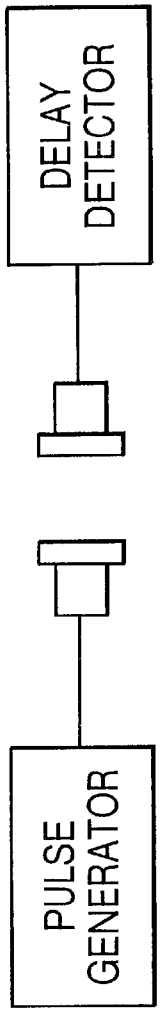
Figure 1:
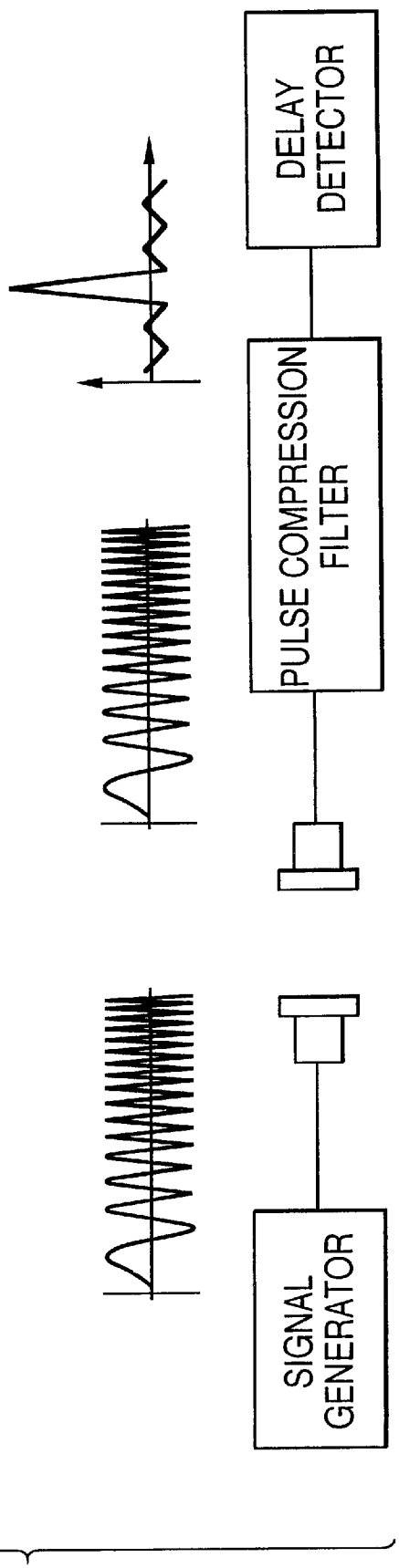

FIG. 1 shows a schematic contrastive illustration for comparison between a conventional pulse transmission system (upper illustration) and a pulse compression system for delay measurement (lower illustration). In the upper part of FIG. 1 a pulse generator is provided for generating and emitting pulses, e.g. ultrasonic pulses, which are subject to a certain dispersion on account of the transmitting medium and which have a delay which is detected by means of a delay detector. In conventional systems threshold techniques are employed for delay detection, e.g. the leading-edge or the zero-crossing or mass centre techniques. All these methods share the common aspect that they require the most distinct pulses possible in order to achieve a reasonable resolution in delay measurement. Satisfactory results can be achieved, however, with the conventional method only with a sufficient signal-to-noise ratio which requires, in its turn, the use of appropriate inductive devices for the generation of high signal levels which are clearly distinguished from the background noise; these devices, however, can be minimised only to a restricted extent.

With the pulse compression technique, however, it is possible to couple more energy into the system even with long signal strings, dispensing at the same time with high signal levels. The pulse compressor unit concentrates the received energy into short pulses which, in their turn, offer a good resolution in delay measurement (cf. in this respect the illustration in the lower part of FIG. 1).

Any signal having an associated auto-correlation function which corresponds approximately to a δ-function, is fundamentally suitable for pulse compression. To this end, in accordance with the invention, the pulse strings generated for transmission are phase-modulated by means of a specific code. The application of the Barker code is particularly well suited, which is composed of binary time-discrete signals having a length M with the values ±1. The code has the property that the auto-correlation function of the signals to be transmitted is smaller than 1 for all values different from 0. The value M is associated at zero points of the auto-correlation function, with M corresponding to the length of the Barker code. Barker codes have become known for values up to M=13.

In addition to the Barker code also M-sequences or pseudo-noise strings are alternatives for the coded modulation of the transmission signals.

Figure 2:
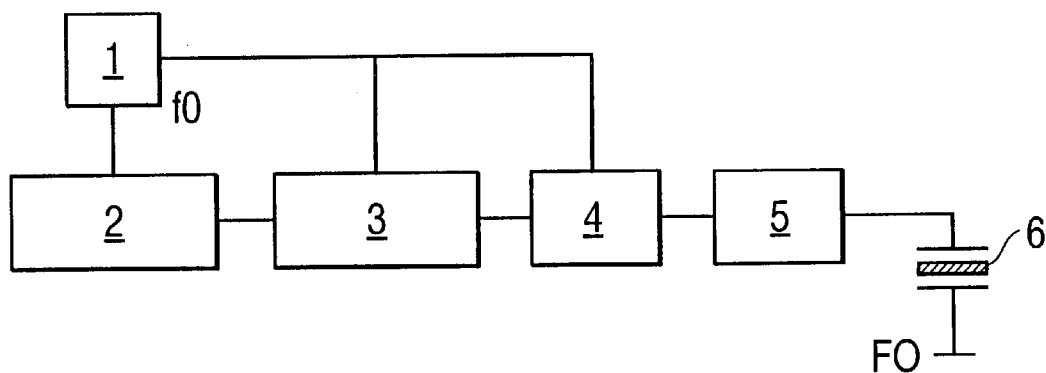
FIG. 2 is a functional diagram of the electronic transmitting system.

For a more detailed description of the structure and for an explanation in terms of function of the electronic transmission system used to generate the ultrasonic pulses reference is made to the illustration in FIG. 2.

An oscillator 1, which generates a fundamental frequency $f_0$, which is preferably within the range of 1 MHz, is connected to a generator 2 for generating a pulse string, to a code generator 3 as well as to a phase shifter 4. Both the pulse repetition rate of the generator 2, the rate for the generation of a code at the code generator 3 and the ultrasonic frequency $F_0$ are derived from the fundamental frequency $f_0$ generated by the oscillator 1. Due to the parallel supply of the units 2, 3 and 4 with the fundamental frequency $f_0$ synchronism of all components is achieved. A downstream driver stage 5 ensures an output-related control of the ultrasonic transducer 6 which emits the ultrasonic waves.

Figure 3:
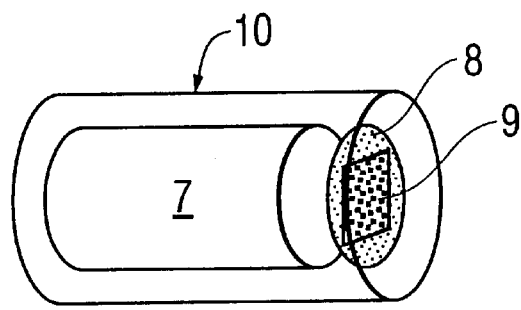
FIG. 3 shows the schematic structure of an ultrasonic transmitter means.

Any isolated components which are required for the engineering implementation of the electronic transmitter system must be composed of purely digital functional units so that these units may be completely integrated into a chi. The electronic transmitter system, which is mounted on a disk substrate 8 and combined on an ASIC chip 9, together with a battery 7, may be integrated within a pilular transducer 10 (cf. in this respect FIG. 3).

Figure 4:
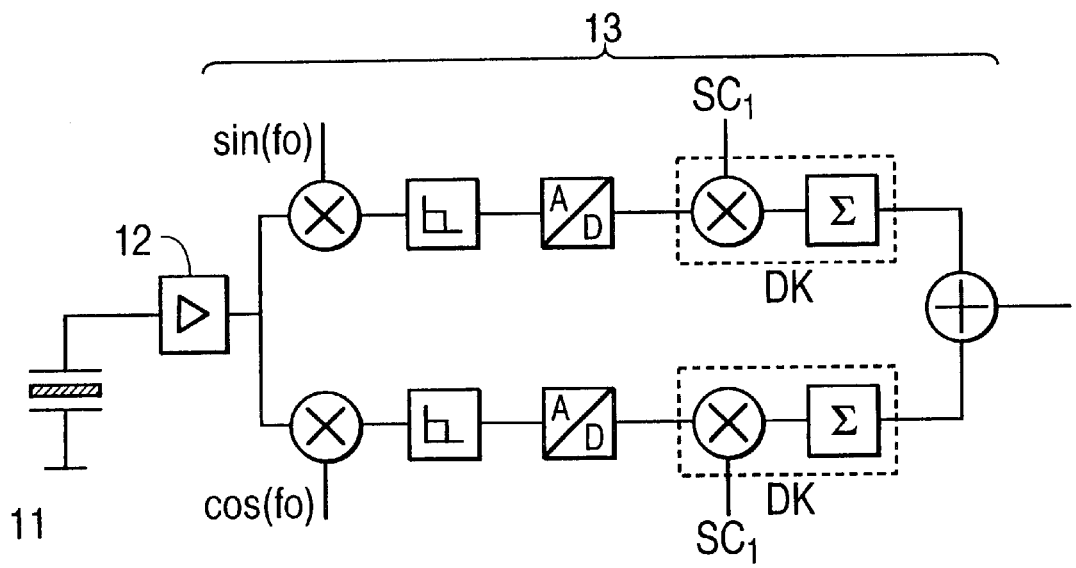
FIG. 4 is a functional diagram of a receiver unit.

The ultrasonic pulses generated by means of the aforedescribed electronic transmitter system are re-converted into electrically processable signals by means of an ultrasonic receiver, as is illustrated in FIG. 4, and are then amplified by means of an amplifier stage 12. Then the signals arrive subsequently in a mixing stage 13 where the received signal is split into two sub-signals which are passed through two circuit systems connected in parallel. There one signal component is mixed with the reference signal ($\sin f_0$)) as carrier whilst the other sub-signal is mixed with a carrier shifted in phase by 90° ($\cos(f_0)$). Then the sub-signals are passed each through a low-pass filter T where, on the one hand, the higher frequency components of the signals are suppressed and, on the other hand, the quadrature components of the received signal are obtained. After A/D conversion the signals are correlated with the transmission pulse string, which is stored as reference signal, in a digital correlator DK. The amounts of the output signals of the correlators are added to each other. By contrast to the quadrature components, the amplitude of the summation signal is independent on the phase relationship of the received signal relative to the reference signals of the mixing stage.

Figure 5:
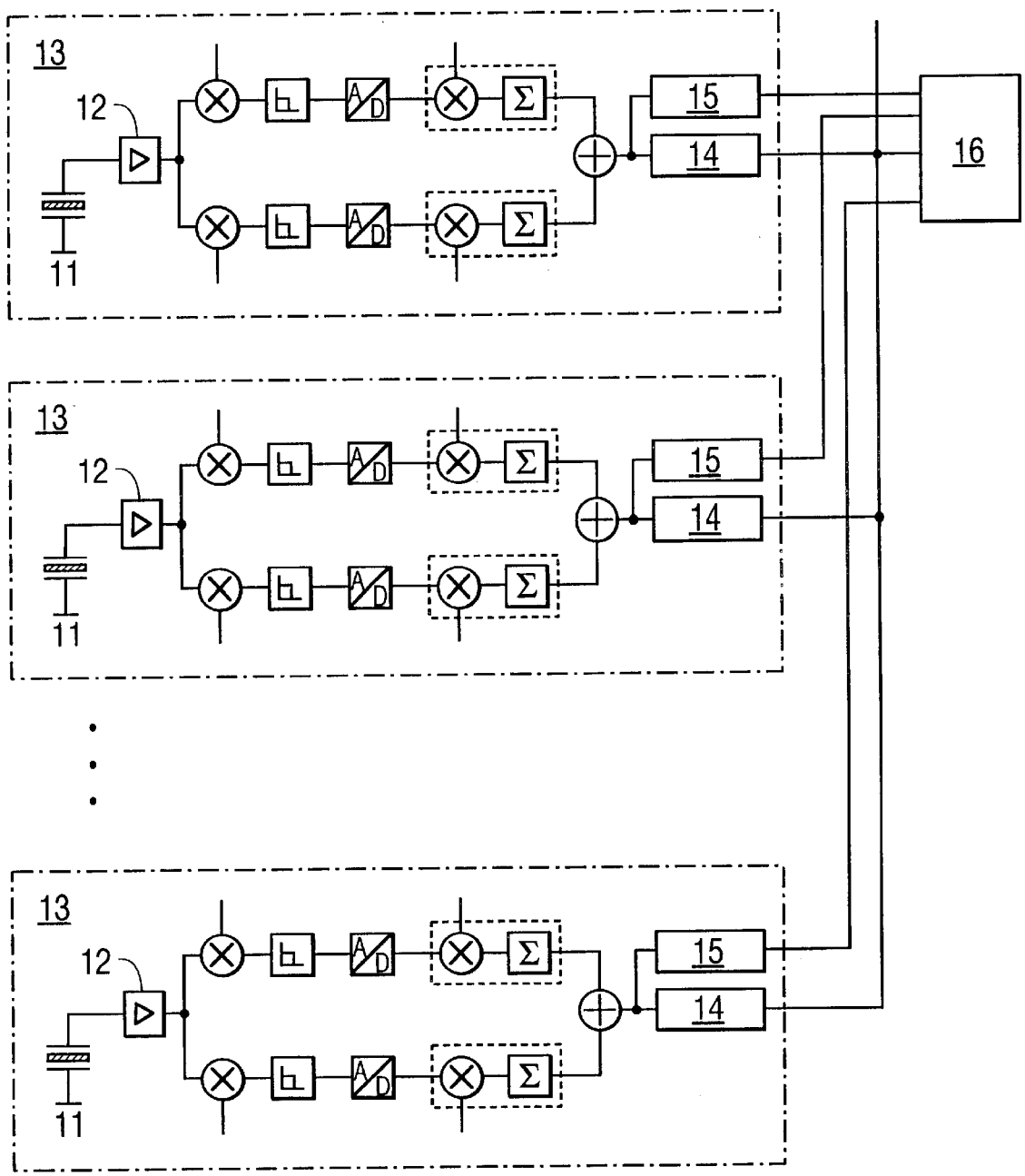
FIG. 5 is the functional diagram of the mixing stage in the receiver unit.

FIG. 5 shows a functional diagram of the receiver unit as a whole, which comprises several ultrasonic receivers 11 as well as downstream receiving units. The received signals, which are correlated in the mixing stage 3 with the transmission pulse string stored as reference signal, are connected to a memory unit 14 at the output side, which may consist, for instance, of a cyclic buffer or a cyclic shift register, respectively. Whenever the digital output signal of the mixing stage 13 exceeds a threshold a threshold detector 15 generates an interrupt which causes a downstream digital signal processor 16 to read the values of the correlation function which are stored in the memory unit 14, and to determine the time of the maximum. On the basis of the pulse arrival times of the individual channels, the processor determines the delay difference and calculates therefrom the position of the generator by means of a triangulation technique.

LIST OF REFERENCE NUMERALS 1 oscillator
2 generator
3 code generator
4 phase shifter
5 driver stage
6 ultrasonic generator
7 battery
8 disk substrate
9 ASIC chip
10 encapsulating case 11 ultrasonic receiver
12 pre-amplifier
13 mixing stage
14 memory unit
15 threshold detector
16 signal processor

We claim:

1. Transmitting and receiving means for ultrasonic waves, comprising a miniaturised ultrasonic generator (6) which operates independently on a battery and which is appropriate for accommodation in a small encapsulating case (10) for medical examinations, as well as at least one ultrasonic receiver (11) which is connected to an analyser which determines, with resolution in terms of time, the distance between said ultrasonic generator (6) and said ultrasonic receiver (10), characterised in that said transmitting means comprises
an oscillator (1) for generating a fundamental mode ($f_0$),
a generator (2) for generating a pulse string which may be used to activate said ultrasonic generator (6),
a code generator (3) which modulates the phase of the pulse string,
a phase shifter (4) which modulates said code onto said fundamental mode ($f_0$), as well as
a driver stage (5) which is connected to said ultrasonic generator (6), and that said receiving means includes one correlation receiver per ultrasonic receiver (11), which compresses the pulse strings emitted by said transmitting means into distinct correlation peaks.

2. Transmitting and receiving means according to claim 1, characterised in that said code generator 83) generates Barker codes, M-sequences or pseudo-noise strings.

3. Transmitting and receiving means according to claim 1, characterised in that said correlation receiver includes a mixing stage (13) which mixes the received signal separately with said fundamental mode as reference signal and with the fundamental mode shifted in phase by 90°, so as to obtain quadrature components, that a low-pass filter system (T) passes said quadrature components through low-pass filtering, and that the position of the correlation maximum may be determined by means of a downstream correlator.

4. Transmitting and receiving means according to claim 3, characterised in that said correlator is connected to a memory unit (14) which serves to store values of a correlation function, as well as to a threshold detector (15).

5. Transmitting and receiving means according to claim 4, characterised in that said memory unit (14) is a cyclic buffer or a cyclic shift register, respectively.

6. Transmitting and receiving means according to claim 4, characterised in that said memory unit (14) is a permanent-writing storage element.

7. Transmitting and receiving means according to claim 3, characterised in that said threshold detector (15) is connected to said analyser and generates an interrupt as soon as the output signal of said correlator exceeds a threshold.

8. Transmitting and receiving means according to claim 7, characterised in that said analyser is a digital signal processor (16) which when an interrupt signal is present reads the values of the correlation function stored in the shift register and determines the time of the correlation maximum.

9. Transmitting and receiving means according to any of the claim 1,
characterised in that the position of the correlation maximum in terms of time corresponds to the time of arrival of a pulse emitted by the transmitting means.

10. Transmitting and receiving means according to any of the claim 1,
characterised in that a plurality of ultrasonic receivers is provided which are disposed in space about said ultrasonic generator for a three-dimensional location of the ultrasonic generator with resolution in terms of time and position.

11. Transmitting and receiving means according to any of the claim 1,
characterised in that said oscillator (1), said generator (2), said code generator (3), said phase shifter (4) as well as said driver stage (5) of said transmitting means are suitable for integration on an ASIC chip (9).

12. Transmitting and receiving means according to any of the claim 1,
characterised in that said code generator (3) is a shift register storing a string of zeros and one's.

13. Transmitting and receiving means according to any of the claim 1,
characterised in that a supply voltage of roughly 3 V is provided for the ultrasonic generator operating on this battery.

14. Transmitting and receiving means according to any of the claim 1,
characterised in that a pulse phase-modulated by said code generator (3) presents a pulse length, in terms of time, of roughly 0.5 $\mu$sec.

15. Transmitting and receiving means according to claim 14,
characterised in that said receiving unit performs a pulse compression of the received pulse strings in such a way that maximum values may be determined with the auto-correlation functions associated with the pulse strings.

16. Transmitting and receiving means according to any of the claim 1,
characterised in that in said transmitting means said ultrasonic generator is adapted to be supplied via driver unit with pulse strings which present a length in terms of time in the $\mu$sec range, and that said receiver unit compresses the received signals.

* * * * *